US008607969B2

(12) United States Patent
Tokiwa et al.

(10) Patent No.: US 8,607,969 B2
(45) Date of Patent: Dec. 17, 2013

(54) COMPOSITION COMPRISING HYDROGEN STORAGE ALLOY AND RESIN

(75) Inventors: Tetsuji Tokiwa, Tokyo (JP); Takashi Iwamoto, Muroran (JP); Yoshinori Kawaharazaki, Muroran (JP); Yasuhiro Fujita, Muroran (JP)

(73) Assignees: Asahi Kasei E-Materials Corporation, Tokyo (JP); The Japan Steel Works, Ltd., Tokyo (JP)

( * ) Notice: Subject to any disclaimer, the term of this patent is extended or adjusted under 35 U.S.C. 154(b) by 1181 days.

(21) Appl. No.: 12/524,247

(22) PCT Filed: Feb. 5, 2008

(86) PCT No.: PCT/JP2008/051868
§ 371 (c)(1),
(2), (4) Date: Jul. 23, 2009

(87) PCT Pub. No.: WO2008/096758
PCT Pub. Date: Aug. 14, 2008

(65) Prior Publication Data
US 2010/0108543 A1     May 6, 2010

(30) Foreign Application Priority Data

Feb. 5, 2007 (JP) .................... 2007-025322
Feb. 5, 2007 (JP) .................... 2007-025326
Jan. 24, 2008 (JP) .................... 2008-013292

(51) Int. Cl.
*B65D 85/00* (2006.01)
*C08L 83/00* (2006.01)
*C08K 3/10* (2006.01)

(52) U.S. Cl.
USPC .............. 206/0.7; 206/0.6; 524/588; 524/401

(58) Field of Classification Search
USPC .................. 524/588, 435, 436; 206/7, 0.7
See application file for complete search history.

(56) References Cited

U.S. PATENT DOCUMENTS 5,104,753 A * 4/1992 Sakai et al. ............ 429/505
6,306,339 B1 10/2001 Kiyokawa et al.

FOREIGN PATENT DOCUMENTS

| CN | 1336856 A | 2/2002 |
|---|---|---|
| EP | 1 151 816 A1 * | 11/2001 |
| EP | 1151816 A1 | 11/2001 |
| JP | 63-310936 A | 12/1988 |
| JP | 3-188236 A * | 8/1991 |
| JP | 03-192654 A | 8/1991 |
| JP | 04-022063 A | 1/1992 |
| JP | 4-104462 * | 4/1992 |
| JP | 4-104463 A * | 4/1992 |

(Continued)

OTHER PUBLICATIONS

Shima et al. (JP 2005-262065 A) Sep. 2005; translation.*
JP 2001-200159 A (Jul. 2001) abstract and translation in English.*
International Preliminary Report on Patentability, Form PCT/ISA/237 (PCT/JP2008/051868), Apr. 1, 2008.

(Continued)

*Primary Examiner* — Rip A. Lee
(74) *Attorney, Agent, or Firm* — Sughrue Mion, PLLC

(57) ABSTRACT

A resin composition including a resin and a hydrogen storage alloy powder. When hydrogen gas is absorbed-released in a hydrogen storage vessel obtained by filling the resin composition in the vessel such that a ratio V2/V1 between a volume V2 of the hydrogen storage alloy powder and an inner volume V1 of the vessel becomes 40 to 80 vol %, a distortion $\alpha$ produced on a wall of the hydrogen storage vessel is $1,000 \times 10^{-6}$ or less.

6 Claims, 2 Drawing Sheets

(56) References Cited

FOREIGN PATENT DOCUMENTS

| JP | 6-187979 A | * | 7/1994 |
| JP | 8-162101 A | * | 6/1996 |
| JP | 2001-200159 A | * | 7/2001 |
| JP | 2002-030360 A | | 1/2002 |
| JP | 2005-262065 A | * | 9/2005 |

OTHER PUBLICATIONS

Office Action dated Jun. 30, 2011 from the State Intellectual Property Office of the People's Republic of China in counterpart Chinese application No. 200880004144.7.

International Search Report dated Apr. 1, 2008 (PCT/JP2008/051868).

* cited by examiner

COMPOSITION COMPRISING HYDROGEN STORAGE ALLOY AND RESIN

CROSS-REFERENCE TO RELATED APPLICATIONS

This application is a 371 of International Application No. PCT/JP2008/051868 filed Feb. 5, 2008, and which claims priority from Japanese Patent Application Nos. 2007-025322 and 2007-025326 both filed on Feb. 5, 2007.

TECHNICAL FIELD

The present invention relates to a composition comprising a hydrogen storage alloy powder and a resin, which is used mainly for hydrogen fuel cells.

BACKGROUND ART

Hydrogen is attracting attention as a new energy source alternative to fossil fuels and to cope with this, studies and developments of the method for storing hydrogen gas are aggressively proceeding. The technique for efficiently storing a large amount of hydrogen gas includes a method utilizing an alloy capable of repeatedly absorbing and releasing hydrogen gas (hydrogen storage alloy). Use of this alloy enables absorbing and releasing a large amount of hydrogen gas under a relatively low pressure and therefore, is greatly convenient compared with the method of directly storing hydrogen gas in a vessel. However, the hydrogen storage alloy expands or contracts up to 30% along with absorption or release of hydrogen gas, and the stress produced here imposes a distortion on the storage vessel and adversely affects the endurance of the vessel. To combat this adverse effect, a technique of compounding the hydrogen storage alloy with an elastic rubbery resin and relieving the stress produced at the absorption and release of hydrogen gas has been proposed. For example, Patent Literatures 1 and 2 disclose a method of mixing a hydrogen storage alloy directly with silicone rubber or with a solution prepared by dissolving silicone rubber in a solvent.

Patent Literature 1: JP-A-2005-262065
Patent Literature 2: JP-A-2001-200159

DISCLOSURE OF THE INVENTION

Problems that the Invention is to Solve

The effect of relieving the stress in a region of the hydrogen storage alloy having a high compositional ratio is still below the practical level. Also, in the case of direct mixing with silicone rubber, since this rubber in general is highly viscous, it has been difficult to uniformly fill the alloy particle in the resin at a high density. On the other hand, in the case of forming a solution of silicone rubber, the problem related to viscous property may be overcome, but a slight amount of a solvent component remaining in the composition is mixed as an impurity in the stored hydrogen gas and this arises as a problem to be solved.

An object of the present invention is to provide a resin composition including a resin and a hydrogen storage alloy powder and ensuring that even when the amount of the hydrogen storage alloy powder filled per unit volume is high, uniform mixing with the resin is achieved and the stress applied to the wall of a hydrogen storage vessel is sufficiently suppressed without impairing the high hydrogen storage capacity.

Means for Solving the Problems

As a result of intensive studies on the resin composition comprising a hydrogen storage alloy powder and a resin so as to solve those problems, the present inventors have found that the above-described resin composition can exert a sufficiently high stress relieving effect without impairing the hydrogen storage property even in a region of the alloy having a high compositional ratio in the resin composition. The present invention has been accomplished based on this finding.

That is, the present invention is as follows.

[1] A resin composition (C) including a resin (A) and a hydrogen storage alloy powder (B), wherein when hydrogen gas is absorbed-released in a hydrogen storage vessel (E) obtained by filling the resin composition (C) in a vessel (D) such that a ratio (V2)/(V1) between a volume (V2) of the hydrogen storage alloy powder (B) and an inner volume (V1) of the vessel (D) becomes 40 to 80 vol %, a distortion a produced on a wall of the hydrogen storage vessel (E) is $1,000 \times 10^{-6}$ or less.

[2] The resin composition (C) as described in [1] above, wherein (V2)/(V1) is from 50 to 70 vol %.

[3] The resin composition (C) as described in [1] or [2] above, wherein a ratio ($\alpha[200]$)/($\alpha[50]$) between the distortion ($\alpha[50]$) produced on the wall of the hydrogen storage vessel (E) when repeating the absorption-release of hydrogen gas 50 times (50th cycle) and the distortion ($\alpha[200]$) produced on the wall of the hydrogen storage vessel (E) when repeating the absorption-release of hydrogen gas 200 times (200th cycle) is 1.4 or less.

[4] The resin composition (C) as described in any one of [1] to [3] above, wherein the resin (A) is a gel-like resin having a ¼ consistency of 10 to 200 at 25° C.

[5] The resin composition (C) as described in [4] above, wherein the gel-like resin is a silicone gel.

[6] The resin composition (C) as described in any one of [1] to [3] above, wherein the resin (A) is a curable silicone having a liquid viscosity of 500 to 10,000 mPas at 25° C.

[7] The resin composition (C) as described in [6] above, wherein the liquid viscosity at 25° C. of the curable silicone is from 800 to 3,000 mPas.

[8] The resin composition (C) as described in [6] or [7] above, wherein the curable silicone is a crosslinked silicone obtained by crosslinking.

[9] The resin composition (C) as described in any one of [1] to [8] above, wherein the resin composition (C) including a resin (A) and a hydrogen storage alloy powder (B) includes the resin (A) in an amount of 0.1 to 50 parts by weight per 100 parts by weight in total of the resin (A) and the hydrogen storage alloy powder (B).

[10] A molded body comprising the resin composition (C) described in any one of [1] to [9] above.

[11] A hydrogen storage vessel (E) comprising the resin composition (C) described in any one of [1] to [9] above and a vessel (D).

[12] A hydrogen storage vessel (E) comprising the molded body described in [10] above and a vessel (D).

Advantage of the Invention

The present invention provides a resin composition including a hydrogen storage alloy powder and a resin, which has an ability of sufficiently relieving the alloy from stress produced at the absorption-release of hydrogen gas without impairing the hydrogen storage property inherent in the alloy.

The present invention also provides the resin composition having a high filling amount of the hydrogen storage alloy powder per unit volume.

DESCRIPTION OF REFERENCE NUMERALS AND SIGNS

Figure 1:
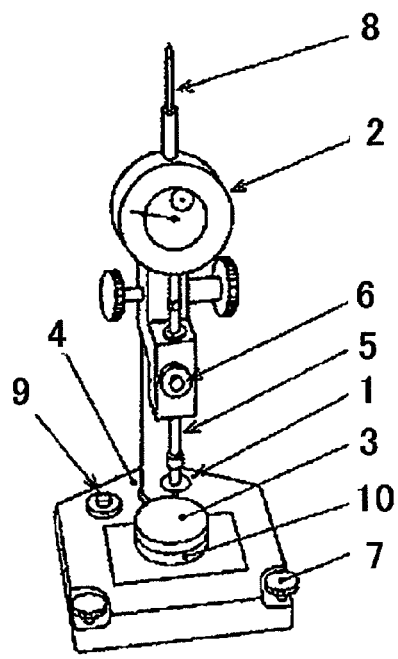
FIG. 1 A schematic view showing the measurement of ¼ consistency at 25° C.

1 Cone
2 Dial gauge
3 Sample stage
4 Supporting table
5 Holding tool
6 Fastener
7 Leveling screw
8 Measurement rack
9 Level
10 Fine adjustment knob
21 Distortion gauge
22 Square vessel
23 Valve
24 Data collecting/recording device
A Distortion measuring direction
31 Distortion gauge
32 Cylindrical vessel
33 Valve
34 Data collecting/recording device
41 Valve A
42 Valve B
43 Vessel 1
44 Vessel 2
45 Water bath

BEST MODE FOR CARRYING OUT THE INVENTION

The present invention is specifically described below.

The resin composition (C) of the present invention includes a resin (A) and a hydrogen storage alloy powder (B). As for the resin (A), either a thermoplastic resin or a thermosetting resin may be used, but a thermosetting resin may be preferably used because it exhibits good processability, that is, the resin can be easily mixed with (B) in a low-viscosity liquid state and a cured product having excellent mechanical properties can be formed by heating the mixture.

As for the thermoplastic resin, a polymer or copolymer of a monomer having an unsaturated group such as double bond or triple bond may be used.

Examples of the monomer include ethylene, propylene, butadiene, isoprene, styrene, α-methylstyrene, methacrylic acid, acrylic acid, methacrylic acid ester, acrylic acid ester, vinyl chloride, vinylidene chloride, fluorinated ethylene, acrylonitrile, maleic anhydride and vinyl acetate. Other examples of the thermoplastic resin include polyphenylene ether, polyamide, polyimide, polyamideimide, polycarbonate, polyester, polyacetal, polyphenylene sulfide, polyethylene glycol, polyetherimide, polyketone, polyether ether ketone, polyethersulfone and polyarylate.

Examples of the thermosetting resin include a phenol resin, an epoxy resin, a cyanate ester resin, a polyimide, a polyurethane, a bismaleimide resin, an alkyd resin, an unsaturated polyester, a silicone resin and a benzocyclo-butene resin. Among these, a silicone resin is preferably used because of low compositional ratio of hydrocarbon impurity and no occurrence of contamination of the hydrogen gas stored.

The curable silicone resin preferably has a liquid viscosity at 25° C. of 500 to 10,000 mPas, more preferably from 800 to 3,000 mPas, still more preferably from 800 to 1,000 mPas. When the liquid viscosity is in the range above, the hydrogen storage alloy powder (B) is uniformly covered with the silicone resin and this provides a lubricating effect to decrease the frictional resistance between powder particles, as a result, the powder is allowed to readily take a close-packed structure. With a liquid viscosity of 500 mPas or more, the resin when formed into a resin composition is liable to stay between powder particles and the composition after curing the silicone resin can maintain the uniformity. Also, with a liquid viscosity of 10,000 mPas or less, the silicone resin can be uniformly dispersed among particles of the hydrogen storage alloy powder (B) and therefore, good uniformity of the resin composition (C) after curing can be advantageously obtained. The liquid viscosity is a value obtained by measuring the resin at 25° C. by means of a B-type rotational viscometer.

The curable silicone resin is preferably of two-liquid addition reaction curing type in view of handleability and long-term reliability, and in this case, it may be sufficient if the liquid viscosity at 25° C. in the stage of two liquids being mixed is from 500 to 10,000 mPas.

As for the silicone resin, there is used a resin that is liquid organopolysiloxane and is generally represented by the formula $(RR'SiO)_n$ (wherein R and R' each is an organic substituent, and n is a natural number). Specifically, R and R' each may be any one of an alkyl group such as methyl group and ethyl group, a phenyl group and a fluoroalkyl group and may have a functional group such as hydroxyl group, alkoxy group or vinyl group at a molecular chain terminal.

Furthermore, the curable silicone resin may be a crosslinked silicone obtained by crosslinking. The crosslinked silicone can be produced by mixing a curable silicone permeable to hydrogen gas and a hydrogen storage alloy powder (B) and performing a curing reaction of the curable silicone. Here, the temperature for curing the silicone resin is preferably from 0 to 200° C., more preferably from 10 to 150° C., still more preferably from 20 to 100° C. When the temperature is 0° C. or more, a curing reaction proceeds, and when it is 200° C. or less, the hydrogen storage alloy powder (B) is allowed to exhibit good uniform dispersibility in the crosslinked silicone.

As for the thermosetting resin, a rubbery resin or gel-like resin having a glass transition temperature lower than room temperature is preferred because of their great effect of relieving the stress at the expansion of the hydrogen storage alloy powder (B). Above all, a gel-like resin is excellent particularly in the performance of relieving the stress distortion applied to the wall of the hydrogen storage vessel (E) and is more preferred. The hardness of the rubbery resin is measured by a durometer A that is used for the measurement of relatively high hardness. On the other hand, the gel-like resin is by far softer than the rubbery resin and the hardness thereof cannot be measured and quantitatively determined by a durometer A but can be measured and quantitatively determined by a consistency meter used for the measurement of hardness of a soft substance such as grease. The consistency is measured by the method specified in JIS K2220, and the gel-like resin for use in the present invention preferably has a ¼ consistency at 25° C. of 10 to 200, more preferably from 30 to 150, still more preferably from 40 to 80. When the ¼ consistency at 25° C. is 10 or more, the stress produced at the expansion and contraction of (B) can be sufficiently relieved and this is preferred, and when it is 200 or less, the density uniformity of the composition can be advantageously maintained for a long period of time.

The hydrogen storage alloy powder (B) is a powder obtained by pulverizing a lump of a hydrogen storage alloy capable of reversibly absorbing-releasing a large amount of hydrogen gas. The chemical structure of (B) is not particularly limited, but an alloy having an $AB_5$, $AB_2$, AB or $A_2B$ structure or a BCC structure may be used. The component A of the $AB_5$ alloy is La alone or a mixture of one or more rare earth elements and La. Specifically, this component is misch metal (Mn) where La or a part of La is replaced by Ce, Pr, Nd or other rare earth elements. On the other hand, examples of the element for the component B include Ni, Mn, Co and Al. The component A of the $AB_2$ alloy is Ti or Zr, and the component B is selected from Mn, Cr, V, Fe and the like. Incidentally, the ratio A:B in the $AB_2$ alloy is not limited to 1:2 but is selected from a wide range between 1:1 and 1:2. The composition representative of the AB alloy is TiFe or TiCo, and the component B can be partially replaced by various kinds of elements. The $A_2B$ alloy is an alloy of which the representative composition is $Mg_2Ni$. The BCC alloy is an alloy having a body-centered cubic crystal structure composed of Ti, Cr, V, Mo or the like. A hydrogen storage alloy powder (B) having an average particle diameter of 1 µm to 1 mm may be used, and the average particle diameter is preferably from 10 to 500 µm. The average particle diameter is preferably 1 µm or more because of good handleability and preferably 1 mm or less in view of dispersibility in the resin composition (C).

The compositional ratio of the resin (A) in the resin composition (C) of the present invention is preferably from 0.1 to 50 parts by weight, more preferably from 0.1 to 10 parts by weight, still more preferably from 1 to 5 parts by weight, per 100 parts by weight in total of the resin (A) and the hydrogen storage alloy powder (B). With a compositional ratio of 0.1 parts by weight or more, the stress associated with expansion and contraction of (B) can be sufficiently relieved, and with a compositional ratio of parts by weight or less, the hydrogen storage alloy powder (B) can be blended in an amount of 50 parts by weight or more and in turn, the storage capacity for hydrogen gas in the hydrogen storage vessel (E) can be increased.

Examples of the method for producing the resin composition (C) include (1) a method of directly mixing the resin (A) and the hydrogen storage alloy powder (B), and (2) a method of mixing a raw material of the resin (A) with the hydrogen storage alloy powder (B) and then gelling the raw material of (A), but in view of uniformity or higher density of the composition, the method of (2) is preferred.

As regards the device for thoroughly stirring and mixing the resin (A) and the hydrogen storage alloy powder (B), a mixer having a stirring blade or a device capable of causing vibration of (B) may be used.

In the case of producing the resin composition (C) by the method of (2), the raw material of (A) may be either one-liquid mixture curable or two-liquid mixture curable but is preferably two-liquid mixture curable in view of easy handleability. The raw material of (A) may be of either addition reaction type or condensation reaction type but is preferably of addition reaction type in view of long-term reliability.

In the resin composition (C), a filler having high thermal conductivity can be added for the purpose of raising the hydrogen gas absorption-release rate. Specifically, the filler is preferably carbon fiber.

The resin composition (C) is not limited in the shape as long as the resin (A) and the hydrogen storage alloy powder (B) are uniformly mixed, but the composition may be formed into an arbitrary molded shape including a sheet and a film. The forming method includes injection molding, T-die molding, extrusion molding, calender molding, transfer molding, compression molding and gum rubber molding.

The material of the vessel (D) may be any of a metal, an inorganic material, an organic material and an organic-inorganic resin composition, but above all, aluminum is preferred in view of mechanical strength, hydrogen barrier property and weight reduction. Of the organic materials, a resin material is preferred in terms of processability and profitability, and specific examples thereof include a thermoplastic resin such as polyamide, polyphenylene sulfide and polyoxymethylene, and a thermosetting resin such as epoxy resin. Furthermore, for the purpose of imparting hydrogen barrier property or mechanical strength to the resin above, an inorganic compound or a carbon fiber may be compounded with.

The shape of the vessel (D) may be arbitrarily selected according to the usage and may be, for example, cubic, columnar, spherical, oval-spherical or bottle-shaped.

The resin composition (C) of the present invention is filled into the vessel (D) to constitute a hydrogen storage vessel (E), whereby hydrogen gas can be simply and easily stored and transported and, if desired, the hydrogen gas can be taken out.

The resin composition (C) that is filled in the vessel (D) may be in a previously molded state. In the case where the resin component of the resin composition (C) is a thermosetting resin, there may be selected either a method of filling the resin composition in a state of having flowability before curing directly into (D) or a method of filling the resin composition in a state of being cured and keeping a certain shape.

When the resin composition (C) of the present invention is filled in the vessel (D), the ratio (V2)/(V1) of the volume (V2) occupied by the hydrogen storage alloy powder (B) to the inner volume (V1) of the vessel (D) is from 40 to 80 vol %, preferably from 50 to 70 vol %, more preferably from 50 to 60 vol %. With a ratio of 40 vol % or more, a large storage capacity for hydrogen gas is yielded, and with a ratio of 80 vol % or less, the stress applied to the wall of the hydrogen storage vessel (E) is reduced.

In the hydrogen storage vessel (E) of the present invention, with the above-described filling amount of the resin composition (C) in the vessel (D), the distortion a produced on the wall of the hydrogen storage vessel (E) at the absorption-release of hydrogen gas needs to be $1,000 \times 10^{-6}$ or less in view of endurance and is preferably $800 \times 10^{-6}$ or less, more preferably $500 \times 10^{-6}$ or less.

The hydrogen storage vessel (E) of the present invention can repeatedly perform the absorption-release of hydrogen gas, but it is preferred that associated with increase in the number of repetitions of absorption-release (hereinafter referred to as the "cycle number"), the stress distortion applied to the wall of the hydrogen storage vessel (E) is not increased or the increase is small. More specifically, the ratio $(\alpha[200])/(\alpha[50])$ between the distortion ($\alpha[50]$) produced on the wall of the hydrogen storage vessel (E) when repeating the absorption-release of hydrogen gas 50 times (50th cycle) and the distortion ($\alpha[200]$) at the 200th cycle is preferably 1.4 or less, more preferably 1.3 or less, still more preferably 1.2 or less, and most preferably 1.1 or less. A distortion ratio of 1.4 or less is preferred in view of endurance of the hydrogen storage vessel (E).

The hydrogen storage vessel (E) is preferably used as a hydrogen source of fuel cells and is preferably used for fuel cell-driven automobiles, two-wheeled motor vehicles, personal computers, digital cameras and cellular phones.

Other than the hydrogen gas storage vessel, the resin composition (C) may be used, for example, for the electrode of an Ni-hydrogen battery.

EXAMPLES

The present invention is described below by referring to Examples.

[¼ Consistency]

In accordance with the ¼ consistency test method of JIS K2220, the cone attached to a ¼ consistence meter was dropped at 25° C. in a sample filled in a pot, and the depth to which the cone penetrated in 5 seconds was read, whereby the consistency was determined (see, FIG. 1).

[Raw Materials Used]

Raw Material of Gel-Like Substance:

(A-1):

Solution A and Solution B of WACKER SilGel612 (produced by Wacker Asahikasei Silicone Co., Ltd.). Two-liquid addition curing-type silicone. Solutions A and B were measured for the liquid viscosity by a B-type rotational viscometer and both found to have a liquid viscosity of 1,000 mPas at 25° C., and the viscosity of a liquid prepared by mixing Solution A and Solution B in a weight ratio of 1:1 was 1,000 mPas at 25° C.

This mixture liquid was left standing at 25° C. for 12 hours, and the ¼ consistency at 25° C. of the obtained gel-like resin was 85.

Raw Material of Rubbery Resin:

(A-2):

Solution A and Solution B of ELASTOSIL M4648 (produced by Wacker Asahikasei Silicone Co., Ltd.). Two-liquid addition curing-type silicone. Solutions A and B were measured for the liquid viscosity by a B-type rotational viscometer, as a result, the liquid viscosity at 25° C. of Solution A was 20,000 mPas and that of Solution B was 700 mPas. The viscosity of a liquid prepared by mixing Solution A and Solution B in a weight ratio of 10:1 was 15,000 mPas at 25° C.

This mixture liquid was left standing at 25° C. for 12 hours, and the resulting resin had a ¼ consistency at 25° C. of 0 and a hardness (shore A) of 36.

Hydrogen Storage Alloy:

(B-1):

An $AB_5$ alloy powder having a chemical structure of $MmNi_{4.4}Mn_{0.1}Co_{0.5}$ (wherein Mm is misch metal and is composed of La, Ce, Pr and Nd) and a particle diameter of 30 to 400 mesh.

[Test Vessel]

Test Vessel 1:

An aluminum alloy-made square vessel (inside dimension: 8.8 mm×8.4 mm×49 mm, wall thickness: 1.8 mm, designed pressure: 6 MPaG).

Figure 2:
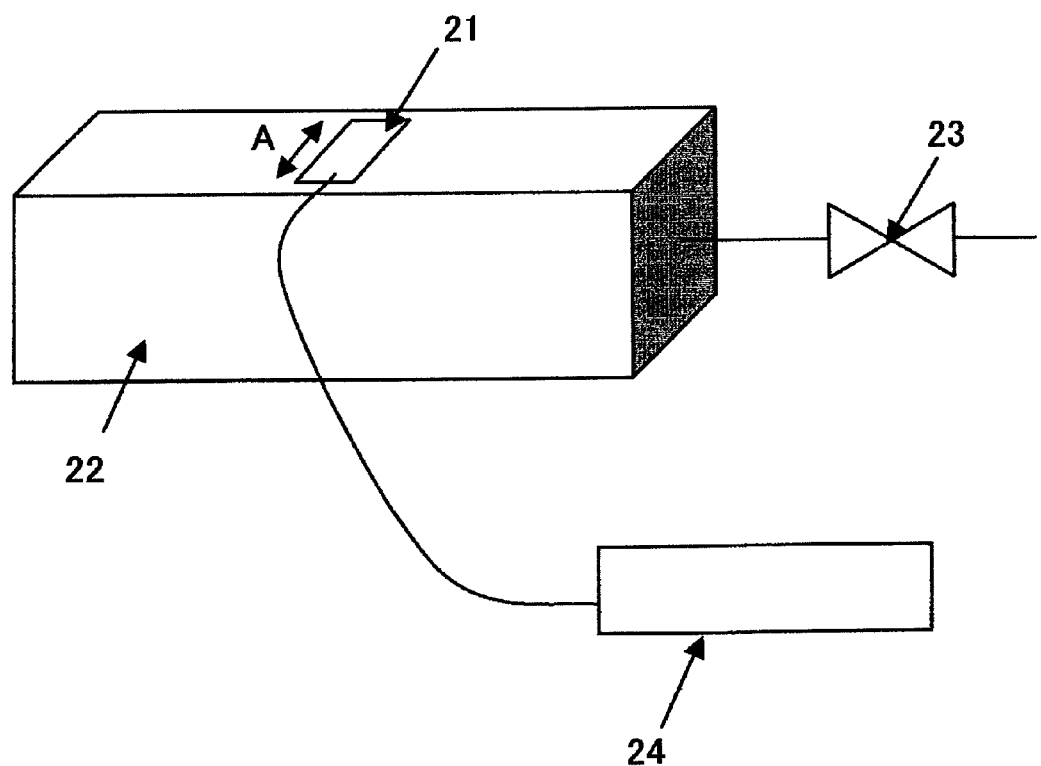
FIG. 2 A schematic view showing the measurement of distortion on a square vessel.

As shown in FIG. 2, a distortion gauge (KFG Series of Kyowa Electronic Instruments Co., Ltd.) is laminated to the vessel surface.

Test Vessel 2:

An SPCE-made cylindrical vessel (18.6 mm (outside diameter)×64.5 mm (length), wall thickness: 0.9 mm, designed pressure: 12 MPaG).

Figure 3:
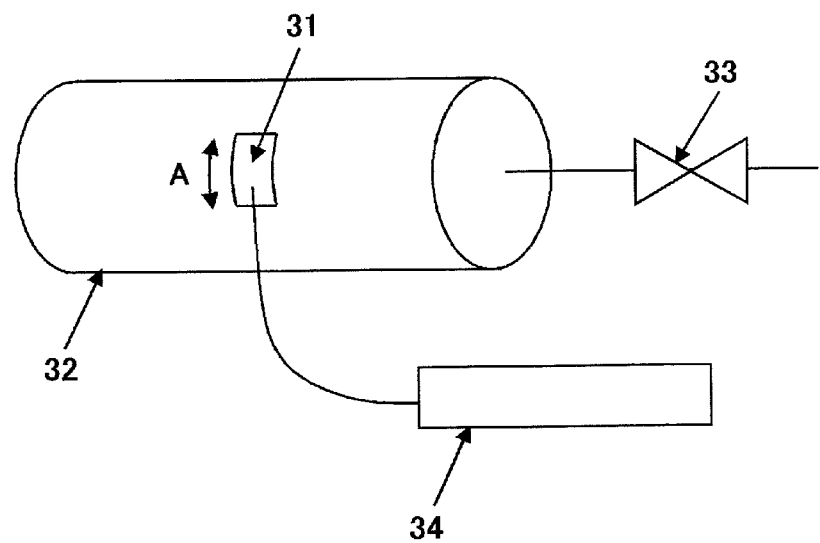
FIG. 3 A schematic view showing the measurement of distortion on a cylindrical vessel.
Figure 4:
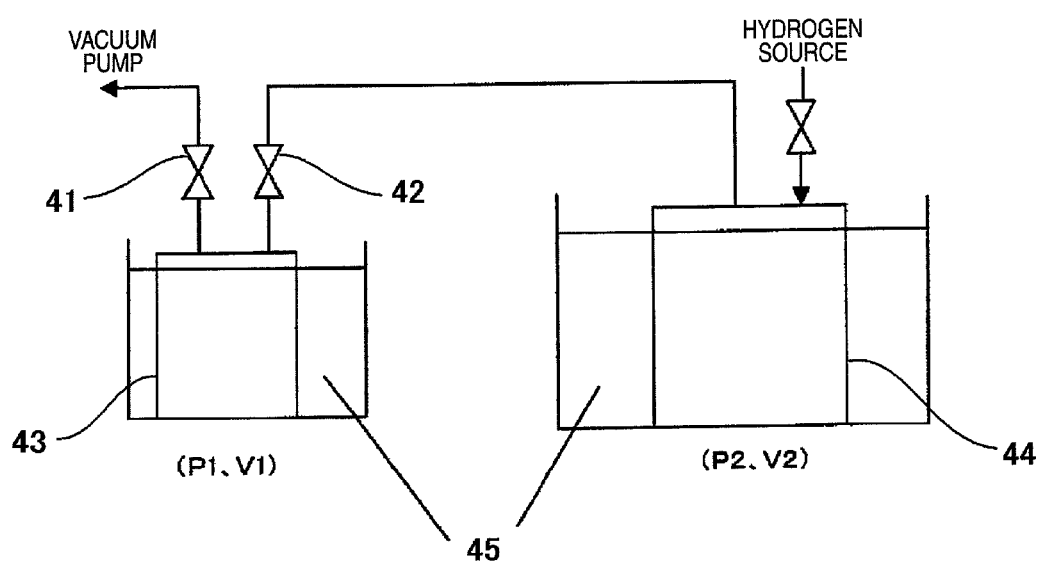
FIG. 4 An apparatus used for measuring the amount of hydrogen gas absorbed into the resin composition.

As shown in FIG. 3, a distortion gauge (KFG Series of Kyowa Electronic Instruments Co., Ltd.) is laminated to the vessel surface.

[Activation Processing Method of Resin Composition]

(1) The resin composition is weighed and filled in the test vessel 1 or vessel 2, and the vessel is hermetically closed by a cover with a hydrogen inlet tube.

(2) The hermetically-closed vessel is heated to 80° C. in a constant temperature bath, and the vacuum state inside the vessel vacuumized by a vacuum pump is maintained for 5 hours or more.

(3) Hydrogen gas is introduced into the vessel at 1 MPaG, and the vessel is then cooled to 20° C. in a water bath.

(4) The hydrogen gas pressure in the vessel is returned to normal pressure.

[Measurement of Stress Distortion Applied to Wall of Hydrogen Storage Vessel at Absorption-Release of Hydrogen]

(1) After an operation of applying an activation treatment through the removal of $O_2$ by the method above and returning the hydrogen gas pressure inside the vessel to normal pressure by pressurization to 1 MPaG at 20° C. is repeated 5 times, a vibration test according to the following steps (2) to (5) is preformed.

(2) The vessel is placed in a vibration tester, and the frequency of vibration is logarithmically increased from 7 Hz to 18 Hz at a peak acceleration of 1 G.

(3) By setting the amplitude to 0.8 mm (entire shift: 1.6 mm) and the peak acceleration to 8 G, the frequency of vibration is logarithmically increased to 50 Hz, further to 200 Hz.

(4) The frequency of vibration is decreased. As for the operation, the frequency of vibration is first logarithmically decreased from 200 Hz to 50 Hz at a peak acceleration of 8 G and then logarithmically decreased at a peak acceleration of 1 G.

(5) The process from (1) to (4) takes 15 minutes, and this process is repeated 12 times.

(6) After the vibration test, absorption of hydrogen at 1 MPaG and release at normal pressure are repeated in the water bath at 20° C. until reaches 200 cycles, and the change of distortion ((L−L0)/L0, wherein L0: the dimension before expansion, L: the dimension after expansion) on the side surface of the vessel is recorded.

Examples 1-1 and 1-2

After weighing 2.50 g of Solution A and 2.50 g of Solution B as (A-1), these two solutions were thoroughly mixed, and 95.0 g of (B-1) was gradually added thereto and mixed well with stirring to obtain a resin composition including (A-1) and (B-1). The compositional ratio of (B-1) in this resin composition was 95.0 parts by weight per 100 parts by weight of the entire amount of the resin composition. The resin composition was planarly pressed and smoothed by an iron bar having a weight of 5 kg and shaped into a sheet form of 2 mm in thickness, and the sheet-shaped resin composition was left standing at 25° C. for 12 hours to produce a 2 mm-thick sheet-like resin composition including a gel-like resin and (B-1). A part of the produced sheet-like resin composition was cut out and filled in the test vessel 1 shown in FIG. 1, the (V2/V1) was adjusted by changing the amount of the sheet packed, and the distortion generated on the wall of the hydrogen storage vessel when changing (V2/V1) was measured. The measurement results are shown in Table 1.

Example 1-3

The procedure was performed in the same manner as in Example 1 except for weighing 1.75 g of Solution A and 1.75 g of Solution B as (A-1) and changing the amount added of (B-1) to 96.5 g. The compositional ratio of (B-1) was 96.5 parts by weight per 100 parts by weight of the entire amount of the resin composition. The measurement results of distortion generated on the wall of the hydrogen storage vessel are shown in Table 1.

Example 1-4

After weighing 1.75 g of Solution A and 1.75 g of Solution B as (A-1), these two solutions were thoroughly mixed, and 96.5 g of (B-1) was gradually added thereto and mixed well with stirring to obtain a resin composition including (A-1) and (B-1). The compositional ratio of (B-1) in this resin composition was 96.5 parts by weight per 100 parts by weight of the entire amount of the resin composition. Before the resin was completely gelled, the obtained resin composition was filled in the test vessel 2. The (V2)/(V1) was 55.0 vol %. The measurement results of distortion generated on the wall of the hydrogen storage vessel are shown in Table 1.

TABLE 1

|  |  | Example 1-1 | Example 1-2 | Example 1-3 | Example 1-4 |
|---|---|---|---|---|---|
| Reaction vessel | | | 1 | | 2 |
| Amount of hydrogen storage alloy occupying in 100 parts by weight of resin composition (parts by weight) | | 95 | | 96.5 | 96.5 |
| Filling percentage of hydrogen storage alloy based on inner volume of vessel (V2)/(V1) (vol %) | | 48.1 | 53.5 | 52.0 | 55.0 |
| Hydrogen storage capacity (L) | | 2.27 | 2.53 | 2.46 | 7.14 |
| Distortion after hydrogen absorption ($\times 10^{-6}$) | 50 Cycles | 101 | 195 | 172 | 208 |
| | 100 Cycles | 107 | 184 | 172 | 214 |
| | 200 Cycles | 107 | 120 | 188 | 257 |
| $\alpha[200]/\alpha[50]$ | | 1.06 | 0.62 | 1.09 | 1.24 |

Comparative Examples 1-1 and 1-2

The procedure was performed in the same manner as in Example 1 except for using 4.55 g of Solution A and 0.45 g of Solution B of (A-2) in place of Solutions A and B of (A-1). The measurement results of distortion generated on the wall of the hydrogen storage vessel are shown in Table 2.

Comparative Example 1-3

The procedure was performed in the same manner as in Comparative Example 1 except for weighing 6.57 g of Solution A and 0.73 g of Solution B as (A-2) and changing the amount added of (B-1) to 92.7 g. The compositional ratio of (B-1) was 92.7 parts by weight per 100 parts by weight of the entire amount of the resin composition. The measurement results of distortion generated on the wall of the hydrogen storage vessel are shown in Table 2.

Comparative Example 1-4

Only the alloy particle (B-1) was filled in the vessel 1 without using a resin component at all. The (V2)/(V1) was 37.0 vol %. The measurement results of distortion generated on the wall of the hydrogen storage vessel are shown in Table 2.

Comparative Example 1-5

Only the alloy particle (B-1) was filled in the test vessel 2 without using a resin component at all. The (V2)/(V1) was 50.0 vol %. The measurement results of distortion generated on the wall of the hydrogen storage vessel are shown in Table 2.

TABLE 2

|  |  | Comparative Example | | | | |
|---|---|---|---|---|---|---|
|  |  | 1-1 | 1-2 | 1-3 | 1-4 | 1-5 |
| Reaction vessel | | | 1 | | | 2 |
| Amount of hydrogen storage alloy occupying in 100 parts by weight of resin composition (parts by weight) | | 95 | | 92.7 | 100 | 100 |
| Filling percentage of hydrogen storage alloy based on inner volume of vessel (V2)/(V1) (vol %) | | 48.5 | 50.2 | 51.4 | 37.0 | 50.0 |
| Hydrogen storage capacity (L) | | 2.29 | 2.37 | 2.43 | 1.75 | 6.43 |
| Distortion after hydrogen absorption ($\times 10^{-6}$) | 50 Cycles | 423 | 484 | 1421 | 2151 | 1109 |
| | 100 Cycles | 470 | 554 | 1561 | 2656 | 1864 |
| | 200 Cycles | 702 | 1193 | 1882 | no data | 1882 |
| $\alpha[200]/\alpha[50]$ | | 1.66 | 2.46 | 1.32 | no data | 1.70 |

As seen from the results of Examples 1-1 to 1-5, even in a region of high compositional ratio of the alloy occupying in the composition, when a gel-like resin was used, the distortion generated on the wall of the hydrogen storage vessel underwent a stable transition in a low region of $500 \times 10^{-6}$ or less. On the other hand, in Comparative Examples 1-1 to 1-3 each using a rubbery resin, the distortion generated on the wall of the hydrogen storage vessel was significantly increased along with an increase in the number of repetitions of hydrogen absorption-release, revealing that the stress relieving effect of the resin portion was decreased. In Comparative Examples 1-4 and 1-5 where a resin component was not used at all, the amount of the alloy filled in the vessel was low compared with Examples, nevertheless, it was confirmed that the distortion generated on the wall of the hydrogen storage vessel resulting from absorption-release of hydrogen gas was extremely high.

Example 2-1

After weighing 3.75 g of Solution A and 3.75 g of Solution B as (A-1), these two solutions were thoroughly mixed, and 92.70 g of (B-1) was gradually added thereto and mixed well with stirring to obtain a resin composition including (A-1) and (B-1). The compositional ratio of (B-1) in this resin composition was 92.7 parts by weight per 100 parts by weight of the entire amount of the resin composition. The resin composition was planarly pressed and smoothed by an iron bar having a weight of 5 kg and shaped into a sheet form of 2 mm in thickness, and the sheet-shaped resin composition was left standing at 25° C. for 12 hours to produce a 2 mm-thick sheet-like resin composition including a crosslinked (A-1) and (B-1). A part of the produced sheet-like resin composition was cut out and evaluated. The results obtained are shown in Table 3.

Example 2-2

A sheet-like resin composition was prepared in the same manner as in Example 2-1 except for weighing 2.50 g of Solution A and 2.50 g of Solution B as (A-1) and changing the amount added of (B-1) to 95.0 g. The compositional ratio of (B-1) in the resin composition was 95.0 parts by weight per 100 parts by weight of the entire amount of the resin composition. A part of this sheet-like resin composition was cut out and evaluated. The results obtained are shown in Table 3.

Example 2-3

A sheet-like resin composition was prepared in the same manner as in Example 2-1 except for weighing 2.00 g of Solution A and 2.00 g of Solution B as (A-1) and changing the amount added of (B-1) to 96.0 g. The compositional ratio of (B-1) in the resin composition was 96.0 parts by weight per 100 parts by weight of the entire amount of the resin composition. A part of this sheet-like resin composition was cut out and evaluated. The results obtained are shown in Table 3.

Example 2-4

A sheet-like resin composition was prepared in the same manner as in Example 2-1 except for weighing 1.50 g of Solution A and 1.50 g of Solution B as (A-1) and changing the amount added of (B-1) to 97.0 g. The compositional ratio of (B-1) in the resin composition was 97.0 parts by weight per 100 parts by weight of the entire amount of the resin composition. A part of this sheet-like resin composition was cut out and evaluated. The results obtained are shown in Table 3.

Example 2-5

A sheet-like resin composition was prepared in the same manner as in Example 2-1 except for weighing 1.00 g of Solution A and 1.00 g of Solution B as (A-1) and changing the amount added of (B-1) to 98.0 g. The compositional ratio of (B-1) in the resin composition was 98.0 parts by weight per 100 parts by weight of the entire amount of the resin composition. A part of this sheet-like resin composition was cut out and evaluated. The results obtained are shown in Table 3.

TABLE 3

|  | Example 2-1 | Example 2-2 | Example 2-3 | Example 2-4 | Example 2-5 |
| --- | --- | --- | --- | --- | --- |
| Concentration of hydrogen storage alloy (parts by weight) | 92.7 | 95.0 | 96.0 | 97.0 | 98.0 |
| Density of resin composition (g/ml) | 4.92 | 4.69 | 4.98 | 4.99 | 4.89 |
| Hydrogen storage alloy per ml of resin composition (g/ml) | 2.86 | 2.69 | 2.91 | 2.91 | 2.85 |

Comparative Example 2-1

A sheet-like resin composition was prepared in the same manner as in Example 2-1 except for using 6.64 g of Solution A and 0.66 g of Solution B of (A-2) in place of Solutions A and B of (A-1). The compositional ratio of (B-1) in the resin composition was 92.7 parts by weight per 100 parts by weight of the entire amount of the resin composition. A part of this sheet-like resin composition was cut out and evaluated. The results obtained are shown in Table 4.

Comparative Example 2-2

A sheet-like resin composition was prepared in the same manner as in Comparative Example 2-1 except for using 4.55 g of Solution A and 0.45 g of Solution B as (A-2) and using 95.0 g of (B-1). The compositional ratio of (B-1) in the resin composition was 95.0 parts by weight per 100 parts by weight of the entire amount of the resin composition. A part of this sheet-like resin composition was cut out and evaluated. The results obtained are shown in Table 4.

Comparative Example 2-3

A sheet-like resin composition was prepared in the same manner as in Comparative Example 2-1 except for using 3.64 g of Solution A and 0.36 g of Solution B as (A-2) and using 96.0 g of (B-1). The compositional ratio of (B-1) in the resin composition was 96.0 parts by weight per 100 parts by weight of the entire amount of the resin composition. A part of this sheet-like resin composition was cut out and evaluated. The results obtained are shown in Table 4.

Comparative Example 2-4

A sheet-like resin composition was prepared in the same manner as in Comparative Example 2-1 except for using 2.73 g of Solution A and 0.27 g of Solution B as (A-2) and using 97.0 g of (B-1). The compositional ratio of (B-1) in the resin composition was 97.0 parts by weight per 100 parts by weight of the entire amount of the resin composition. A part of this sheet-like resin composition was cut out and evaluated. The results obtained are shown in Table 4.

Comparative Example 2-5

A sheet-like resin composition was prepared in the same manner as in Comparative Example 2-1 except for using 1.82 g of Solution A and 0.18 g of Solution B as (A-2) and using 98.0 g of (B-1). The compositional ratio of (B-1) in the resin composition was 98.0 parts by weight per 100 parts by weight of the entire amount of the resin composition. A part of this sheet-like resin composition was cut out and evaluated. The results obtained are shown in Table 4.

TABLE 4

|  | Comparative Example | | | | |
| --- | --- | --- | --- | --- | --- |
|  | 2-1 | 2-2 | 2-3 | 2-4 | 2-5 |
| Concentration of hydrogen storage alloy (parts by weight) | 92.7 | 95.0 | 96.0 | 97.0 | 98.0 |
| Density of resin composition (g/ml) | 4.59 | 4.30 | 4.28 | 4.08 | 4.18 |
| Hydrogen storage alloy per ml of resin composition (g/ml) | 2.62 | 2.40 | 2.38 | 2.24 | 2.30 |

While the invention has been described in detail and with reference to specific embodiments thereof, it will be apparent to one skilled in the art that various changes and modifications can be made therein without departing from the spirit and scope thereof. This application is based on Japanese patent application (Japanese Patent Application No. 2007-025322) filed on Feb. 5, 2007, Japanese patent application (Japanese Patent Application No. 2007-25326) filed on Feb. 5, 2007 and Japanese patent application (Japanese Patent Application No. 2008-013292) filed on Jan. 24, 2008, and their contents are incorporated herein by way of reference.

INDUSTRIAL APPLICABILITY

The resin composition and hydrogen storage vessel of the present invention are suitably used in or as a hydrogen storage vessel for hydrogen fuel cells.

The invention claimed is:

1. A resin composition including a resin and a hydrogen storage alloy powder,
    wherein when hydrogen gas is absorbed-released in a hydrogen storage vessel obtained by filling the resin composition in a vessel such that a ratio V2/V1 between a volume V2 of the hydrogen storage alloy powder and an inner volume V1 of the vessel becomes 40 to 80 vol %, a distortion α produced on a wall of the hydrogen storage vessel is $1,000 \times 10^{-6}$ or less,
    wherein the resin is a gel-like resin having a ¼ consistency of 10 to 200 at 25° C. in accordance with the test method of JIS K2220.

2. The resin composition according to claim 1,
    wherein the ratio V2/V1 is from 50 to 70 vol %.

3. The resin composition according to claim 1,
    wherein a ratio α[200]/α[50] between the distortion α[50] produced on the wall of the hydrogen storage vessel when repeating the absorption-release of hydrogen gas 50 times and the distortion α[200] produced on the wall of the hydrogen storage vessel when repeating the absorption-release of hydrogen gas 200 times is 1.4 or less.

4. The resin composition according to claim 1, wherein the gel-like resin is a silicone gel.

5. The resin composition according to claim 1,
    wherein the resin composition including a resin and a hydrogen storage alloy powder includes the resin in an amount of 0.1 to 50 parts by weight per 100 parts by weight in total of the resin and the hydrogen storage alloy powder.

6. The resin composition according to claim 1,
    wherein the resin composition including a resin and a hydrogen storage alloy powder includes the resin in an amount of 0.1 to 50 parts by weight per 100 parts by weight in total of the resin and the hydrogen storage alloy powder.

* * * * *